United States Patent [19]

Durst

[11] Patent Number: 4,582,711

[45] Date of Patent: * Apr. 15, 1986

[54] STORAGE STABLE, READY-TO-EAT COOKED GOODS

[75] Inventor: Jack R. Durst, Champlin, Minn.

[73] Assignee: The Pillsbury Company, Minneapolis, Minn.

[ * ] Notice: The portion of the term of this patent subsequent to Apr. 16, 2002 has been disclaimed.

[21] Appl. No.: 631,691

[22] Filed: Jul. 16, 1984

Related U.S. Application Data

[63] Continuation-in-part of Ser. No. 489,661, May 6, 1983, Pat. No. 4,511,585.

[51] Int. Cl.$^4$ ...................... A21D 18/06; A21D 13/00
[52] U.S. Cl. .................................... 426/128; 426/331; 426/335; 426/403; 426/412; 426/549
[58] Field of Search ............... 426/549, 331, 335, 510, 426/532, 106, 128

[56] References Cited

U.S. PATENT DOCUMENTS 3,914,445 10/1975 Pavey ................................. 426/326

Primary Examiner—Raymond Jones
Assistant Examiner—Elizabeth A. King
Attorney, Agent, or Firm—Robert J. Lewis

[57] ABSTRACT

Ready-to-eat baked goods which are of high quality and are shelf stable for up to one year, are disclosed. They are prepared from a flour containing base-batter mix, water, sugar and at least 5% by weight of the product of an edible, liquid polyhydric alcohol. The water activity level of the baked good is equal to or less than 0.85, the ratio of total water to edible liquid, polyhydric alcohol is equal to or less than 4.8 and the ratio of starch to edible, liquid polyhydric alcohol is equal to or less than 3.95.

25 Claims, No Drawings

STORAGE STABLE, READY-TO-EAT COOKED GOODS

BACKGROUND OF THE DISCLOSURE

This application is a continuation-in-part of my copending continuation-in-part application Ser. No. 489,661 filed May 6, 1983 now Pat. No. 4,511,585.

This invention relates broadly to baked, ready-to-eat flour containing products, such as those typically sold as packaged bakery products. Amongst the types of products which can be prepared in accordance with this invention are crumb-structured products such as cakes, dumplings, breads, bagels, refrigerated biscuits, quick breads, and the like. These products are all characterized in that they normally contain in the final baked good, nearly all gelatinized starch. In addition, the technology of this invention can be used to prepare brownies and cookies which are of higher sugar and lower water content than those previously described as crumb-structured, and are further characterized in that they are usually not as high in gelatinized starches.

One of the problems with preparing products of the type discussed above for pre-packaged shipment and sale, is that such products have a very short shelf life. This is a distinct disadvantage if one intends such products to compete with fresh bakery goods.

Products which have been previously baked and pre-packaged and shipped for sale must, if they intend to compete with fresh-baked goods, maintain their fresh-baked characteristics. These characteristics include moistness, eating quality, tenderness, good taste and flavor, and generally all of those characteristics of high quality fresh-baked goods.

Providing such pre-baked and packaged products which are shelf stable to normal deterioration of these before-mentioned desirable attributes, is not an easy task. It is known that "staling" occurs within a short period of time for fresh-baked goods. Thus, those prepared at a bakery for immediate sale have a very short shelf life, typically, a day or two, up to at most one week. Packaging can extend that shelf life somewhat, but again such products inevitably will stale in a short time if current technology is practiced. Such staling will typically occur within a week or two, at most.

"Staling", as used herein, refers to a phenomenon which involves many different physical and chemical factors. Amongst those are texture staling caused by recrystallization of the gelatinized starches, moisture drying, chemical changes causing flavor changes, and microbiological spoilage. Of particular importance here in the overall staling phenomenon is recrystallization of the starches.

As is known, during baking most of the starches of the type used in crumb-structured products, become hydrated and undergo physical chemical changes. That is to say, the starch swells by taking on water with some of the amylose leaving the granule. The amylopectin remaining in the granule can later retrograde, i.e. recrystallize. The starch granules during this change (commonly defined as pasting and graphically illustrated on a pasting curve) may reach a higher degree of folding, distortion and collapsing of the granule. However, over a period of time, the amylopectin portion of the starch begins to recrystallize in areas and assume a rigid structure. This makes the product tougher, makes the crumb structure more rigid and gives the consumer the impression of a dried-out product, even though the moisture content is the same. This recrystallization or realignment during storage is one of the main problems which destroys long shelf life for baked, packaged and shipped bakery products.

Accordingly, it is a primary objective of the present invention to prepare baked, ready-to-eat, packaged high quality baked goods which are storage stable to provide a long shelf life, typically from one month up to as long as one year.

Another objective of the present invention is to prepare ready-to-eat baked goods of the type described, which retain high moistness, good eating quality and which in addition, have controlled or reduced degree of gelatinized starch, even in their fresh-baked condition than a conventional counterpart product.

Yet another object of this invention is to prepare crumb-structured baked goods containing starch gelatinized to a lesser degree, which have all the ready-to-eat characteristics of such equivalent fresh-baked products, which do in fact contain starches gelatinized to a greater degree.

Yet another object of the present invention is to prepare crumb-structured, ready-to-eat baked goods which have starch gelatinized to a lesser degree, and which have a low water activity, are resistant to microbiological spoilage, and which also resist significant chemical changes during storage.

An even further object of the present invention is to prepare crumb-structured products of the type previously described, which can be upon a conventional flour base mix portion and a liquid portion, to be mixed with the base mix to form a batter or dough (hereinafter batter), with the liquid portion containing at least a 5% by weight level of a liquid edible polyhydric alcohol based upon the total weight of the cooked baked good.

A more specific objective of the present invention is to prepare products of this type described using the preferred edible liquid polyhydric alcohol, glycerine.

An even further objective is to prepare high sugar, low water product, like cookies and brownies, which also have much longer than usual shelf life.

The method and manner of accomplishing each of the above objectives, as well as others, will become apparent from the detailed description of the invention, which follows. Unless stated to the contrary, all percents as expressed herein, are percent by weight.

SUMMARY OF THE INVENTION

Long shelf life, stable, crumb-structured, ready-to-eat baked goods are prepared from a flour containing base batter mix portion, which itself is mixed with a liquid portion. The liquid portion to be mixed with the flour to form a batter or dough (hereinafter batter), containing at least 5% by weight of the total product of an edible liquid polyhydric alcohol, preferably glycerine. The water activity level ($A_w$) of the baked good is equal to or less than 0.85, the ratio or total water in the baked good to the edible liquid polyhydric alcohol is equal to or less than 4.8 and the ratio of starch (on a dry basis) to the edible liquid polyhydric alcohol is equal to or less than 3.95. Initial $A_w$ of the batter is also controlled to less than about 0.93.

A crumb-structured baked good, using a batter formulation having the properties just described, after baking, contains starch which after cooking (e.g. baking) has a lesser degree of gelatinization than conventional comparable product. It is therefore resistant to traditional staling; and yet the consumer perceives the product, even after long periods of time, as fresh, and of no discernible difference, when compared to fresh-baked bakery products.

DETAILED DESCRIPTION OF THE INVENTION

One of the more surprising features of the present invention is that the baked crumb-structured goods, when the invention is practiced, contain starch with a substantially lesser degree of gelatinization. Heretofore it was not thought that a high quality baked good was possible unless the starch was gelatinized to a high degree. This is particularly true with cakes and breads. However, if this invention is practiced, for crumb-structured products, like cakes and breads, the result is a product which has substantially less gelatinized starch. It is therefore more resistant to starch retrogradation or recrystallization. And yet, the consumer perceives no significant difference between the invention products and comparable conventional baked goods.

Production of the storage stable bakery products of this invention required certain changes to the composition of the batter or dough normally employed for preparing such products.

The expression, "flour containing base batter mix" as used herein, refers to typical batter or dough compositions for chemically leavened cakes, yeast leavened breads, and the like. Thus, for convenience of description, batter, as used herein, can mean so-called "cake batter" or "bread dough".

As is well known to those in the art of preparing culinary products, the precise formulation of the flour containing base batter mix will vary, depending upon the precise bakery product one seeks to make. However, generally a typical dry mix formulation will contain some portions of the following basic ingredients. The preferred leavening system is chemical leavening including an acid and base preferably GDL and sodium bicarbonate. Yeast and yeast combined with the chemical leaveners can also be used.

| FLOUR CONTAINING DRY BASE | |
|---|---|
| | Range of % Usage |
| Flour (high protein flour is used for breads) | 14-93 |
| Eggs | 0-9 |
| Sugar | 0-55 |
| Shortening | 0-55 |
| Yeast | 0-22 |
| Chemical Leavening | 0-7 |
| Salt | 0-3 |
| Flavoring | 0-60 |
| Other Minors such as preservatives, BHA, BHT, etc. | 0-1.5 |

This basic batter dry mix is added to other optional ingredients and a liquid portion such as water, to produce the desired specific product, as will be illustrated in the examples. The flour, as used herein, may be cereal flours, other grain flours, legume flours and the like.

In conventional processing, the batter dry mix is added to water and mixed to form a batter which is cooked. When the batter is cooked, it results in a cake, bread, etc. which contains substantially completely gelatinized starches.

It has been found that by controlling the $A_w$ of the batter with the addition of an edible liquid polyhydric alcohol that the pasting curve of the product can be changed sufficiently to provide a high quality, long shelf life product particularly high sugar, for example 10% or more sugar by weight of the finished product. The inventive products have sufficient polyhydric alcohol and are cooked under conditions to achieve an increase in shelf life of at least about 10% particularly very high sugar low $A_w$ products e.g. brownies and cookies preferably at least about 20%, and more preferably at least about 50% and most preferably at least about 100% and still maintain equal or better quality than a comparable conventional product. By controlling cooking conditions, as is known in the art, the condition of the starch granules can now be controlled and still produce high quality products.

Microscopic evaluation of the present invention show that the starch granules in the present invention have not reached a high degree of folding, distortion and collapsing (indicators of progressing into further stages of gelatinization) as are generally found in conventionally baked (cooked) crumb structured products. Gelatinization as used herein is synonymous with pasting and can also mean the loss of the optical property birefringence.

Quality and shelf life are measured against a conventionally cooked product of the same general formula with the polyhydric alcohol removed. For comparison the conventional product, after conventional baking or cooking, should have the same total liquid (water) as the invention total liquid content (water plus liquid polyhydric alcohol) after cooking. Quality comparison is made within 24 hours after baking or cooking and can be affected by the flavor of the polyhydric alcohol which should be discounted in the comparison. Further, the conventional and invention product should be packaged and stored the same for comparison purposes.

The testing is organoleptic because product attributes vary so widely. Organoleptic properties can in certain cases be correlated to physical measurements for example an Instrom hardness tester for firming.

The invention preferably has a batter or dough $A_w$ of less than 0.93 more preferably less than 0.87 and most preferably less than 0.80. It should be at a level to provide the above described quality and shelf life value. The invention has a batter or dough ratio of total water to edible liquid polyhydric alcohol equal to or less than about 4.8 preferably less than about 4.0 and most preferably less than about 2.6.

The preferred cooking method is with atmospheric steam.

The gelatinization of the starch in the product can be comparatively quantified by several methods: alpha amylase testing and can be measured by microscopic techniques which are well known.

The degree of gelatinization or pasting can be also quantified by measuring the amount of swelling of the starch granules as is known. In the present invention it is believed that the swelling should be less than about 75% preferably less than about 50% by volume (on an average of a number of granules) of a conventional comparable product.

Prior approaches to shelf stability have included film packaged cakes, canned cakes and the like. In the conventional canning process for prepackaged products, such as cakes, the batter may be placed in a can with the lid loosely clinch sealed, steam cooked and then hermetically sealed to provide a canned cake. Typically during the steam cooking, the product is retorted at say, 250°

F. and 15 psi for about 30 minutes depending upon can size. While producing product of this type in hermetically sealed containers of all types, does preserve their shelf life for a short period of time, they are still subject to chemical starch retrogradation, and texture and flavor changes in a relatively short period of time, at most a few weeks. If this invention is practiced, such products can be made stable for from about one month up to about one year.

In accordance with this invention, it has been discovered that if in the liquid portion of the batter from about 5% to about 15% by weight of the total baked product of an edible liquid polyhydric alcohol is used, the result will be that the product looks, feels and tastes like conventional ready-to-eat baked goods. As a result, the product is not as susceptible to significant starch retrogradation, that is, recrystallization. This is so because the major portion of the starch has not gelatinized as much. Moreover, the water activity level is lower than in conventional baked goods. This results in less susceptibility to microbial spoilage and other physical-chemical changes.

These desirable results are only achieved when certain critical parameters are met. Those are the following.

First, the amount of liquid edible polyhydric alcohol must be 5% or more, preferably 5% to 15% and most preferably from about 7% to about 10% by weight of the final baked product. The polyhydric alcohol must be liquid because it is completely miscible with water and acts to extend the moistness as if higher quantities of water were present in the baked good. It, of course, must also be edible. The preferred polyhydric alcohol is glycerine. In certain instances, it may be preferable to mix the glycerine with propylene glycol, or 1,3 butylene glycol.

The second critical factor is that the water activity ($A_w$) of the baked good must be equal to or less than 0.85, preferably equal to or less than 0.80. This water activity level is measured in the final product, after cooking by known standard measurement techniques.

The third critical factor is that the ratio of total water of the baked good to the edible liquid polyhydric alcohol must be equal to or less than 4.8, preferably 4.0 or less and most preferred 2.6 or less.

Fourth, and finally, the ratio of the starch (on a dry basis) of the cooked or baked good to the edible liquid polyhydric alcohol must be equal to or less than 3.95, preferably equal to or less than about 3.2 and most preferred about 1.8 or less.

Providing that these combinations of conditions are all achieved in the same crumb-structured product, the result will be a product which has all the appearance of conventional fresh-baked goods; and a product which has a shelf stability of from about one month up to about one year. This is very significant. Even with hermetically sealed products such as prior art produced canned cakes, the shelf stability before evidence of staling, has never exceeded a few weeks.

It is not known precisely why the combination of initial conditions expressed above result in the achievement of the significant advantages of this invention. However, while not wishing to be bound by any theory, it is believed that the edible liquid polyhydric alcohol, such as glycerine, at the high levels used in this invention, somehow functions to bind the lowered water that is present in such a manner that it prevents substantially complete gelatinization from occurring. The liquid property of the polyhydric alcohol in combination with the water in the product allows a low water activity product which the consumer perceives to be no different than conventional products with higher amounts of water and substantially gelatinized starch.

It should be mentioned at this point that lower levels of glycerine, such as the low levels commonly employed for humecant purposes, will not achieve the results of this invention. The results are achievable only if the level of edible liquid polyhydric alcohol is within the expressed range, and if the water activity level is equal to or less than 0.85, and the ratio of total water to edible liquid polyhydric alcohol equal to or less than 4.8, and finally, the ratio of starch to liquid polyhydric alcohol is equal to or less than 3.95. When these critical combinations of conditions are achieved, baked crumb-structured products can be prepared which have all the appearances and quality of conventional products. And yet are perceived by the consumer as equal in every way to conventional ready-to-eat baked goods.

While the invention has particular usefulness in preparing canned cake products, it is also very suitable and useful for preparing other crumb-structured products as well.

This invention is also useful in preparing high sugar/low $A_w$ products; e.g. cookies and brownies. When polyhydric alcohol is used in these inventions it produces a product which has a much longer shelf life than a conventional comparable product and retards sugar crystallization.

A conventional comparable cookie has the same general formula as the invention, except the conventional comparable cookie dough or batter has a total water content equal to the total water plus liquid polyhydric alcohol content as in the batter or dough of the invention. In addition, a conventional comparable cookie baked under similar conditions to the invention shows signs of sugar crystallization when stored under normal storage conditions and times while the invention shows none or negligible.

The high sugar/low water baked or cooked good has a ratio of water to starch preferably equal to or less than about 1.0 and more preferably equal to or less than about 0.75 and a ratio of water to sugar preferably equal to or less than about 0.75 and more preferably equal to or less than about 0.50.

The dough or batter to make a high sugar/low water cooked good has a ratio of water to starch preferably equal to or less than about 1.20 and more preferably equal to or less than about 1.0 and a ratio of water to sugar preferably equal to or less than about 1.0 and more preferably equal to or less than about 0.8.

After cooking the cooked product has a sugar content in the liquid phase (water plus polyhydric alcohol) of less than about 70%, preferably less than about 65% and most preferably less than about 60% by weight of liquid phase.

The numbers given in the following chart should not be regarded as dependent upon any fillers such as chocolate chip used in the cookies.

| DOUGHS OR BATTERS |
|---|
| % LIQUID |

-continued

| | % $H_2O$ | % STARCH | % SUGAR | POLYHYDRIC ALC | WATER/STARCH | WATER/SUGAR | COMMENTS |
|---|---|---|---|---|---|---|---|
| CHOCOLATE CHIP COOKIE BASE - INVENTION | 13.11 | 20.73 | 24.32 | 9.55 | 0.63 | 0.54 | No Sugar Crystallization |
| SUGAR COOKIE | 20.56 | 26.98 | 28.49 | — | 0.76 | 0.72 | Sugar Crystallization |
| SUGAR COOKIE-CRISP | 16.62 | 28.99 | 30.61 | — | 0.57 | 0.54 | Sugar Crysatllization |
| BROWNIE I | 19.25 | 10.16 | 41.04 | — | 1.90 | 0.47 | Sugar Crystallization |
| BROWNIE II | 19.65 | 5.00 | 47.37 | — | 3.93 | 0.42 | Sugar Crystallization |
| BUTTERSCOTCH BROWNIE | 14.93 | 12.38 | 50.90 | — | 1.21 | 0.29 | Sugar Crystallization |
| INVENTION BROWNIE | 13.80 | 19.59 | 29.02 | 7.20 | 0.70 | 0.48 | No Sugar Crystallization |

COOKED

| | % $H_2O$ | % STARCH | % SUGAR | % LIQUID POLYHYDRIC ALC | WATER/STARCH | WATER/SUGAR | SUGAR IN AQUEOUS PHASE | COMMENTS |
|---|---|---|---|---|---|---|---|---|
| CHOCOLATE CHIP COOKIE BASE - INVENTION | 7.19 | 22.03 | 25.85 | 10.15 | 0.33 | 0.28 | 59.8* | No Sugar Crystallizataion |
| SUGAR COOKIE | 7.9 | 30.89 | 32.62 | — | 0.26 | 0.24 | 80.5 | Sugar Crystallization |
| SUGAR COOKIE-CRISP | 2.6 | 33.72 | 35.60 | — | 0.08 | 0.07 | 93.2 | Sugar Crystallization |
| BROWNIE I | 4.0 | 11.99 | 48.42 | — | 0.33 | 0.08 | 92.4 | Sugar Crystallization |
| BROWNIE II | 3.5 | 5.96 | 56.49 | — | 0.59 | 0.06 | 94.2 | Sugar Crystallization |
| BUTTERSCOTCH BROWNIE | 4.0 | 13.90 | 57.15 | — | 0.29 | 0.07 | 93.5 | Sugar Crystallization |
| INVENTION BROWNIE | 13.80 | 19.59 | 29.02 | 7.20 | 0.70 | 0.48 | 58.08* | No Sugar Crystallization |

*Aqueous Phase (liquid phase) is made up of water plus liquid polyhydric Alcohol
Sugar Saturation Point is about 68% in water and 55% in Glycerin A typical formulation comparison for this invention and a conventional cake mix, brownie/cookie mix, and doughs for breads are set forth below:

COMPARISON TABLE

| | Cake Product | | Brownie/Cookie | | Bread Products | |
|---|---|---|---|---|---|---|
| Ingredient % by wt. finished product | Typical (Range) | Invention (Pound Cake) | Typical (Range) | Invention (Brownie) | Typical (Range) | Invention |
| Flour | 14–33% | 24.8% | 20–50% | 28.0% | 10–65% | 51.0% |
| Sugar | 15–38% | 25.7% | 20–40% | 29.0% | 0–14% | 3.2% |
| Shortening | 7–29.5% | 12.1% | 12–25% | 13.3% | 0–47.5% | 4.4% |
| Added Water | 0–27% | 10.0% | 0–10% | 3.6% | 0–30% | 4.4% |
| Egg, Whole | 10–27.5% | 14.1% | 5–12% | 8.6% | 0–11% | 0.0% |
| Leavening | 0–3% | 0.36% | 0–0.3% | 0.11% | 0–5% | 1.7% |
| Yeast | 0% | 0% | 0% | 0% | 0–15% | 1.2% |
| Minors, (Salt, Flavors etc) | 0–5% | 2.7% | 0–5% | (incl. nuts) 9.9% | 0–5% | 4.3% |
| Polyhydric alcohol | 0% | 10.3% | 0% | 7.5% | 0% | 10.0% |
| Total Water | 17–36% | 25.1% | 3.5–10% | 13.8% | 22–36.5% | 31.8% |

The above table shows the formulation differences between cake type products, brownie/cookie type products, and bread type products. Each of these type products can be prepared in accordance with this invention, providing that the $A_w$, polyhydric alcohol, starch to polyhydric alcohol, and water to polyhydric alcohol ratios are adjusted to meet the criteria heretofore discussed.

With regard to ordinarily gelatinized products such as cakes and breads, shelf stability is achieved because, in this invention, the degree of gelatinization is less, along with other chemical and microbiological changes. With regard to normally ungelatinized, low moisture, high sugar products like brownies and cookies, sugar cannot crystallize and other chemical changes are prevented.

The invention is particularly effective in products having more than about 10% sugar, preferably more than about 15% sugar, and more preferably more than about 25%, on a dry basis, of the cooked product.

Heretofore, it has been mentioned that the polyhydric alcohol may be a mixture of edible liquid polyhydric alcohols. For cakes, and breads, it has been found desirable, and therefore preferred, to employ a mixture of glycerine and propylene glycol. Up to 40% of the total amount of the polyhydric alcohol portion of the finished product can be propylene glycol, as long as the absolute amount does not exceed 2% of the weight of the finished product. When this is done, the low $A_w$ combination with the propylene glycol even prevents zerotrophic mold growth, avoiding the necessity for additional pasteurization. As a result, open baking followed by non-sterile packaging conditions can be used.

The following examples serve to illustrate, but not limit, this invention. They show use in preparing crumb-structured products such as pound cakes, carrot cake, bread, and finally brownies. Also shown is a comparison of those with fresh baked product. They are compared in terms of shelf storage stability, microbial spoilage, appearance and eating quality.

While the above description has been given with regard to batter mixes, it should also be understood that it is possible to employ this invention with a dry culinary mix product to which the consumer adds a measured amount of water.

The process of preparing these products is illustrated in the examples. Both the control and the invention products used identical conditions.

For cakes in a selected container, whether canned, plastic tray, paperboard or aluminum, the following standard procedure was used. The batter is placed on a release paper in the container, a cover slip is placed on the batter, and then the cover is sealed on the container. A small one-sixteenth inch hole is pierced in the center of the lid. The container is placed in an atmospheric steamer (210° F.) and heat processed until product temperature in the center of the container is 200° F. The containers are tilted approximately 30° to allow any condensate to run off and then the hole is covered with pressure sensitive tape. The extra leavening gases are vented through the hole, allowing the cakes to rise and flushing out any oxygen in the product container. When the cake has risen to fill the container, the cover slip plugs the hole, thus preventing any product contamination. The product, being hot, has a positive pressure which vents formed gases, and then while still hot (200° F.) and having a positive pressure, the pressure sensitive tape is applied effectively aseptically sealing the container. The containers are then allowed to cool at room temperature, leaving a small vacuum in the container.

EXAMPLE 1

A pound cake ($A_w$ 0.80) was prepared, having the following ingredients. It was prepared using the atmospheric steam process as described above.

| Ingredients | % | % $H_2O$ of Ingredients | % $H_2O$ Contributed to total |
|---|---|---|---|
| Cake Flour | 24.84 | 14.0 | 3.48 |
| Sugar | 25.68 | — | |
| Sweet Whey Solids | 1.20 | 3.5 | 0.04 |
| Vegetable Shortening | 6.87 | — | |
| Salt | 0.61 | — | |
| Flavors & Colors | 0.52 | 4.0 | 0.02 |
| Thickness | 0.38 | — | |
| Margarine | 5.20 | 15.5 | 0.81 |
| Whole Eggs | 14.07 | 73.7 | 10.37 |
| Glycerine | 10.27 | 4.0 | 0.41 |
| Chemical Leavening | 0.36 | — | — |
| Water | 10.00 | 100.0 | 10.00 |
| | 100.00 | | 25.13 |

The starch to glycerine ratio was 1.77. The water to glycerine ratio was 2.55, and as mentioned, the water activity was 0.8.

Prior to cooking the dry ingredients were thoroughly blended in a Hobart mixer, the shortening was melted, and the shortening, eggs, water and glycerine were added. Thereafter, mixing continued in the Hobart Mixer on #2 speed until homogeneous blending was noted. Thereafter, it was mixed at speed #3 for five minutes.

The processing time necessary to reach the 200° F. temperature outlined above was approximately 45 minutes to make a 275 gram cake.

In storage studies this product was initially compared with a pound cake prepared in exactly the same manner, except that the glycerine was replaced with water. The glycerine added product was examined for gelatinization and found to be less than the conventional product. Aging studies were conducted using the pound cake of the invention and comparison with another fresh control pound cake of the invention in just-baked condition. Those results are shown in the Tables I and II below. Basically, the studies involve both cakes having been cooked under the conditions previously described and then stored under identical conditions at temperatures of 40°, 70°, 100°, and 115° F. Periodically, they were checked for microbiological spoilage, visual comparison for evidence of deterioration and finally, a blind test expert panel tasted them to compare eating qualities. The test time varied from one week to 38 weeks.

TABLE I

MICROBIOLOGICAL AND WATER ACTIVITY DETERMINATIONS ON ATMOSPHERIC STEAM PROCESSED POUND CAKES, IN 603 × 108 CANS.

| Time/ Weeks | Storage Temp. | TPC* | 35° C. Aerobic Spores | 35° C. Aerobic Spores | 55° C. Aerobic Spores | $A_w$ |
|---|---|---|---|---|---|---|
| 0 | Batch 1 | 17 | <3 | <3 | <3 | .778 |
| | Batch 2 | 7 | <3 | <3 | <3 | .779 |
| | Batch 3 | 3 | <3 | <3 | <3 | .803 |
| | Batch 4 | 3 | <3 | <3 | <3 | .780 |
| | Batch 5 | 13 | <3 | <3 | <3 | .784 |
| 2 | 115° F. | 3 | <3 | <3 | <3 | .793 |
| | 100° F. | 7 | <3 | <3 | <3 | .798 |
| | 70° F. | <3 | <3 | <3 | <3 | .805 |
| | 40° F. | 320 | <3 | <3 | <3 | .799 |
| | 0° F. | 7 | <3 | <3 | <3 | .805 |
| 4 | 115° F. | <3 | <3 | <3 | <3 | .784 |
| | 100° F. | <3 | <3 | <3 | <3 | .778 |
| | 70° F. | <3 | <3 | <3 | <3 | .785 |
| | 40° F. | 80 | <3 | <3 | <3 | .789 |
| | 0° F. | 7 | <3 | <3 | <3 | .770 |
| 6 | 115° F. | 17 | <3 | <3 | <3 | .785 |
| | 100° F. | 7 | <3 | <3 | <3 | .795 |
| | 70° F. | 13 | <3 | <3 | <3 | .806 |
| | 40° F. | 3 | <3 | <3 | <3 | .795 |
| | 0° F. | 13 | <3 | <3 | <3 | .831 |
| 8 | 115° F. | 3 | <3 | <3 | <3 | .787 |
| | 100° F. | 13 | <3 | <3 | <3 | .790 |
| | 70° F. | 7 | <3 | <3 | <3 | .782 |
| | 40° F. | 3 | 7 | <3 | <3 | .793 |
| | 0° F. | 63 | <3 | <3 | <3 | .790 |
| 12 | 115° F. | 7 | <3 | <3 | <3 | .789 |
| | 100° F. | <3 | <3 | <3 | <3 | .770 |
| | 70° F. | 17 | 7 | <3 | <3 | .783 |
| | 40° F. | <3 | <3 | <3 | <3 | .764 |
| | 0° F. | 3 | <3 | <3 | <3 | .781 |
| 16 | 115° F. | | NO SAMPLE | | | |
| | 100° F. | <3 | <3 | <3 | <3 | .765 |
| | 70° F. | <3 | <3 | <3 | <3 | .734 |
| | 40° F. | <3 | <3 | <3 | <3 | .755 |
| | 0° F. | <3 | <3 | <3 | <3 | .773 |
| 20 | 115° F. | | NO SAMPLE | | | |
| | 100° F. | <3 | <3 | <3 | <3 | .790 |
| | 70° F. | <3 | <3 | <3 | <3 | .790 |
| | 40° F. | 36 | <3 | <3 | <3 | .800 |
| | 0° F. | <3 | <3 | <3 | <3 | .799 |
| 26 | 115° F. | | NO SAMPLE | | | |
| | 100° F. | | NO SAMPLE | | | |
| | 70° F. | 2 | 10 | <10 | <10 | .792 |
| | 40° F. | 9 | 10 | <10 | <10 | .792 |
| | 0° F. | 13 | <10 | <10 | <10 | .796 |
| 38 | 115° F. | | NO SAMPLE | | | |
| | 100° F. | | NO SAMPLE | | | |

TABLE I-continued
MICROBIOLOGICAL AND WATER ACTIVITY DETERMINATIONS ON ATMOSPHERIC STEAM PROCESSED POUND CAKES, IN 603 × 108 CANS.

| Time/ Weeks | Storage Temp. | TPC* | 35° C. Aerobic Spores | 35° C. Aerobic Spores | 55° C. Aerobic Spores | $A_w$ |
|---|---|---|---|---|---|---|
| | 70° F. | <10 | 10 | <10 | <10 | .800 |
| | 40° F. | <10 | <10 | <10 | <10 | .807 |
| | 0° F. | <10 | <10 | <10 | <10 | .809 |

As can be seen from an examination of Table I, the pound cake product of this invention as measured from 0 to 38 weeks, was initially low in bacterial counts, and the counts and the $A_w$ stayed constant over the entire time, showing $A_w$ and microbiological stability.

In studying the microbiological counts, microbiologists took samples from the centers of the cakes, in an aseptic manner, examined them under a microscope and used standard microbiological counting techniques.

Table II (following page) shows the organoleptic and color evaluations.

TABLE II
ORGANOLEPTIC AND COLOR EVALUATIONS ON ATMOSPHERIC STEAM PROCESSED POUND CAKES OF EXAMPLE 1

| Time/ Weeks | 115° F. | 100° F. | 70° F. | 40° F. | 0° F. |
|---|---|---|---|---|---|
| 0 | | | | | Refrigerated until stored. High quality moist, heavy texture cake with excellent flavor and golden color. |
| 2 | Only very slight color change noted. Acceptable as quality cake. | Similar to control | Similar to control | Similar to control | Identical to description of sample at time 0. High quality cake. |
| 4 | Only very slight color change. Very slightly less flavor than freezer control. Good texture. Acceptable | Very slight darkening of color. Similar to control. Acceptable | Similar to control | Similar to control | High quality cake. |
| 6 | Good texture, some flavor loss, more carmel flavor, color continuing to darken slightly. Acceptable | Good texture, similar to frozen control. Flavor slightly less intense than control. Color has hint of darkening. Acceptable. | Texture, flavor and color is very similar to frozen control. | Similar to control | High quality cake |
| 8 | Good texture and aroma, definately changing in flavors, does not have pound cake flavor. Color continues to become browner. Borderline. | Good texture and flavor, although flavor is less intense. Color becoming slightly darker. Acceptable. | Good color, texture and flavor. Quite similar to control | Similar to control | High quality cake |
| 12 | Flavor old, carmel. Texture is slightly drier but good. Color changed to color of dry toast. Not Acceptable. | Good texture. Color only slightly browning. Very slight flavor change. Acceptable. | Similar to control | Similar to control | Maintains high quality |
| 16 | Samples depleted. | Good texture. Moist. Color only slightly darker. Flavor is carmelizing. Borderline. | Similar to control | Similar to control | Maintains high quality. |
| 20 | Samples depleted. | Good texture. Aromatic after taste which is disagreeable. Color becomes darker. Not Acceptable. | Quite similar to control, with decrease in "pound cake" flavor. Acceptable. | Similar to control | High quality cake. |
| 26 | Samples depleted. | Samples depleted. | Good flavor and texture with only slight darkening of color. Acceptable. | Similar to control. | High quality cake. |
| 32 | Samples depleted. | Samples depleted. | Similar to control. Very slight darkening of color and flavor changes. Acceptable. | Similar to control. | High quality cake. |
| 38 | Samples depleted. | Samples depleted. | Similar to control with very slight darkening of color, slight loss of "pound cake" flavor. Good texture. Acceptable. | Similar to control. | High quality cake. |

EXAMPLE 2

A cake in accordance with Example 1 was prepared with the following difference. The polyhydric alcohol remained at the level of 10.27% by weight; however, 20% of its polyhydric alcohol content was propylene glycol. The cake was processed in a conventional oven at 340° F. for 50 minutes, cooled and innoculated with zerotrophic mold spores, packaged in a sealed polyethylene bag and stored at room temperature. This cake has remained mold free and of high quality for 90 days, and is still in storage. A conventional formulated cake, processed the same way, molded and staled in eight days.

As can be seen, in every instance the product after long storage compared very favorably to the fresh product indicating again excellent long term stability.

EXAMPLE 3

(Carrot Cake)

| Ingredients | % | % H₂O of Ingredients | % H₂O Contributed to total |
|---|---|---|---|
| Sugar | 21.72 | — | |
| Flour | 16.14 | 12.0 | 1.94 |
| Shortening, Emulsified | 4.68 | — | |
| Puffed Carrot Granules | 1.20 | 4.0 | 0.05 |
| Starch | 1.09 | 12.0 | 0.13 |
| Salt | 0.42 | — | |
| Spices & Coloring | 0.71 | 7.0 | 0.05 |
| Leavenings | 0.76 | — | |
| Thickeners | 0.12 | — | |
| Whole Eggs | 14.28 | 73.7 | 10.52 |
| Oil | 5.80 | — | |
| Raisins | 6.94 | 18.0 | 1.25 |
| Nuts | 11.79 | 3.5 | 0.41 |
| Glycerine | 5.69 | 4.0 | 0.23 |
| Water | 8.66 | 100.0 | 8.66 |
| | 100.0 | | 23.24 |

The water activity level was 0.8. The starch to glycerine ratio was 2.21 and the water to glycerine ratio was 4.26.

The basic make-up procedure was the same as in the previous example. The steaming process was approximately 63 minutes to make a 370 gram cake.

The following Table III shows the microbiological and water activity determinations for the product for periods of zero weeks up to 38 weeks.

Table IV shows organoleptic and color evaluations by an expert panel in accordance with the procedure discussed in Example 1.

TABLE III

MICROBIOLOGICAL AND WATER ACTIVITY DETERMINATIONS ON ATMOSPHERIC STEAM PROCESSED CAKES, IN 603 × 108 CANS. CARROT CAKE WITH RAISINS AND NUTS

| Time/ Weeks | Storage Temp. | TPC* | 35° C. Anaerobic Spores | 35° C. Anaerobic Spores | 55° C. Anaerobic Spores | $A_w$ |
|---|---|---|---|---|---|---|
| 0 | Batch 1 | 27 | <3 | <3 | <3 | .805 |
| | Batch 2 | 180 | <3 | <3 | <3 | .817 |
| | Batch 3 | 33 | <3 | <3 | <3 | .796 |
| | Batch 4 | 160 | <3 | <3 | <3 | .802 |
| | Batch 5 | 77 | <3 | <3 | <3 | .813 |
| | Batch 6 | 230 | <3 | <3 | <3 | .814 |
| 2 | 115° F. | 330 | <3 | <3 | <3 | .809 |
| | 100° F. | 20 | <3 | <3 | <3 | .814 |
| | 70° F. | 100 | <3 | <3 | <3 | .823 |
| | 40° F. | 110 | <3 | <3 | <3 | .819 |
| | 0° F. | 5 | <3 | <3 | <3 | .816 |
| 4 | 115° F. | 50 | <3 | <3 | <3 | .827 |
| | 100° F. | 3 | <3 | <3 | <3 | .795 |
| | 70° F. | 100 | <3 | <3 | <3 | .812 |
| | 40° F. | 53 | <3 | <3 | <3 | .800 |
| | 0° F. | 43 | <3 | <3 | <3 | .805 |
| 6 | 115° F. | 350 | <3 | <3 | <3 | .803 |
| | 100° F. | 23 | <3 | <3 | <3 | .787 |
| | 70° F. | 630 | <3 | <3 | <3 | .805 |
| | 40° F. | 210 | <3 | <3 | <3 | .825 |
| | 0° F. | 90 | <3 | <3 | <3 | .794 |
| 8 | 115° F. | 27 | <3 | <3 | <3 | .807 |
| | 100° F. | 40 | <3 | <3 | <3 | .799 |
| | 70° F. | 110 | <3 | <3 | <3 | .808 |
| | 40° F. | 830 | <3 | <3 | <3 | .809 |
| | 0° F. | 200 | <3 | <3 | <3 | .810 |
| 12 | 115° F. | <3 | <3 | <3 | <3 | .768 |
| | 100° F. | 7 | <3 | <3 | <3 | .780 |
| | 70° F. | 57 | 53 | 10 | <3 | .781 |
| | 40° F. | 47 | 20 | <3 | <3 | .806 |
| | 0° F. | 583 | 350 | 3 | <3 | .791 |
| 16 | 115° F. | <3 | <3 | <3 | <3 | .822 |
| | 100° F. | 10 | 3 | 3 | <3 | .820 |
| | 70° F. | 30 | 7 | <3 | <3 | .749 |
| | 40° F. | 113 | 30 | <3 | <3 | .788 |
| | 0° F. | 27 | 7 | 3 | <3 | .794 |
| 20 | 115° F. | | NO SAMPLE | | | |
| | 100° F. | 122 | <3 | <3 | <3 | .802 |
| | 70° F. | 26 | <3 | <3 | 6 | .808 |
| | 40° F. | 59 | 3 | <3 | <3 | .822 |
| | 0° F. | 69 | 17 | <3 | <3 | .823 |
| 26 | 115° F. | | NO SAMPLE | | | |
| | 100° F. | | NO SAMPLE | | | |
| | 70° F. | 60 | 120 | 70 | 10 | .799 |
| | 40° F. | 40 | 170 | 60 | 30 | .805 |
| | 0° F. | 70 | 380 | 150 | 40 | .818 |
| 32 | 115° F. | | NO SAMPLE | | | |
| | 100° F. | | NO SAMPLE | | | |
| | 70° F. | 60 | 110 | 10 | 10 | .826 |
| | 40° F. | 110 | 50 | 20 | 20 | .818 |
| | 0° F. | 70 | 100 | 50 | 30 | .823 |
| 38 | 115° F. | | NO SAMPLE | | | |
| | 100° F. | | NO SAMPLE | | | |
| | 70° F. | 10 | 90 | <10 | 20 | .814 |
| | 40° F. | 40 | 30 | 20 | 10 | .820 |
| | 0° F. | 30 | 40 | 10 | <10 | .830 |

TABLE IV

ORGANOLEPTIC AND COLOR EVALUATIONS ON CARROT CAKE OF EXAMPLE II
CARROT CAKE WITH RAISINS AND NUTS

| Time/ Weeks | STORAGE TEMPERATURE | | | | |
|---|---|---|---|---|---|
| | 115° F. | 100° F. | 70° F. | 40° F. | 0° F. |
| 0 | | | | Dense, moist high quality cake. Distinct spice flavor. Golden brown color with flecks of orange carrot pieces throughout. | |
| 2 | Similar to control | Similar to control | Similar to control | Similar to control | High quality cake. Excellent flavor, color and eating. |
| 4 | Very slight darkening of | Texture and flavor excellent | Similar to control | Similar to control | High quality cake |

TABLE IV-continued
ORGANOLEPTIC AND COLOR EVALUATIONS ON CARROT CAKE OF EXAMPLE II
CARROT CAKE WITH RAISINS AND NUTS

| Time/ Weeks | STORAGE TEMPERATURE | | | | |
|---|---|---|---|---|---|
| | 115° F. | 100° F. | 70° F. | 40° F. | 0° F. |
| | color noted. Nuts appear slightly darker-but flavor not changed. Flavor of spices seem more intense. Acceptable | Very slight darkening of crumb, raisins and nuts. | | | |
| 6 | Good texture. Crumb structure continues to darken Browning of raisins and nuts. Only slight flavor changes. No rancidity of nuts. Acceptable. | Some darkening of total cake, including nut, raisins & carrot pieces. Good texture Flavor has changed but does not have an "off" flavor. Acceptable. | Similar to control | Similar to control | High quality cake |
| 8 | Texture somewhat drier. Color changes more pronounced. Flavor changes; hint molasses, and stronger spice, more like overcooked fruit cake. Not Acceptable | Good flavor and texture. Very little darkening of cake since last pulled though nuts and raisins have darkened. Acceptable. | Similar to control | Similar to control | High quality cake |
| 12 | Cake has become quite brown. Has flavor of overcooked fruit cake. Texture is slightly drier. Nuts do not taste rancid, but color has darkened. Edible. Not Acceptable | Very slight darkening of crumb structure as well as nuts, raisins and carrot pieces. Texture good. Flavor becoming more like fruit cake but edible Acceptable. | Similar to control | Similar to conrol | High quality cake |
| 16 | Very dark brown color. Flavor of overcooked fruit cake with a bitter burned taste. Texture becoming very dry. Not Acceptable. | Good texture, however somewhat drier. Color somewhat darker. Carrot pieces appear orange. Flavor beginning to resemble fruit cake rather than carrot cake. Borderline. | Similar to control Acceptable. | Similar to control | High quality cake |
| 20 | Samples depleted. | Color becoming very brown. Texture satisfactory. Flavor of overcooked fruit cake. Not Acceptable. | Good texture and only slight darkening of crumb structure. Very slight favor loss. Acceptable. | Similar to control | High quality cake. Unchanged. |
| 26 | Samples depleted. | Samples depleted. | Very slight darkening of crumb. Texture excellent/Flavor good. Acceptable. | Similar to control. | High quality cake. |
| 32 | Samples depleted. | Samples depleted. | Good color, flavor & texture, only minor color change & very slight flavor change. Acceptable. | Similar to control. | High quality cake. |
| 38 | Samples depleted. | Samples depleted. | Very slightly darker color. Nuts of good flavor & crunchy. Flavor more like spice cake. Texture excellent Acceptable. | Similar to control. | High quality cake. |

EXAMPLE 4

A bread utilizing the invention was prepared. The bread was a typical sponge dough bread formulation. The sponge dough bread formula was as follows:

| Ingredients | % | % H$_2$O of Ingredients | % H$_2$O Contributed to total |
|---|---|---|---|
| Bread flour | 30.00 | 14.0 | 4.20 |
| Water | 18.00 | 100.0 | 18.00 |
| Yeast (Dry active) | 1.21 | 5.0 | 0.06 |
| Sugar | 0.22 | | |
| | 49.43 | | |

The sponge dough formulation was prepared into a bread dough batter or dough mix in accordance with the following:

| Ingredients | % | % H$_2$O of Ingredients | % H$_2$O Contributed to total |
|---|---|---|---|
| Bread flour | 21.00 | 14.0 | 2.94 |
| Shortening | 4.40 | — | |
| Non-fat milk solids | 2.20 | 3.5 | 0.08 |
| Sugar | 3.00 | — | |
| Salt | 2.00 | — | |
| Myvatex (dough conditioner monoglyceride) | 0.11 | — | |
| Sodium Bicarbonate | 0.60 | — | |
| Glucona delta lactone | 1.10 | — | |
| Water | 6.16 | 100.0 | 6.16 |
| Glycerine | 8.50 | 4.0 | 0.34 |

| Ingredients | % | % H$_2$O of Ingredients | % H$_2$O Contributed to total |
|---|---|---|---|
| | 50.57 | | 31.78 |

The starch to liquid polyhydric alcohol ratio was 3.22. The water activity level was 0.843. The water to liquid polyhydric alcohol ratio was 3.29.

In the sponge process, the sugar from the sponge formulation was dissolved in water at 110° F. to disperse it, and the active dry yeast was then added and dispersed. The bread flour was placed in a Hobart mixer bowl and the sponge formula ingredients were added at mixing speed #1, using a dough hook for one minute. The mixer was stopped and the bowl scraped down, and then mixed at #2 speed for three additional minutes.

The dough was placed in a greased container and allowed to rise under fermenting conditions for four hous in a proofing cabinet set at 82° F. and an 85% relative humidity.

With regard to the bread dough formulation, all the dry ingredients were added to the Hobart mixing bowl and blended for one minute at #1 speed using a mixing paddle. Shortening was added and mixing was continued at #1 speed for one more minute. Thereafter, the mixing paddle was replaced with a dough hook, water, glycerine and propylene glycol were added while mixing at #1 speed for one more minute. The mixer was stopped, scraped down and mixing continued at #2 speed for an additional minute.

Thereafter, the sponge which had been fermented for the four hours was mixed in for 4½ minutes to develop the gluten. This was then formed into 800 gram loaves and placed in a greased 9×5 inch bread baking pan. It was placed in a proofing cabinet at 108° and 88% relative humidity and proofed until the product rose to the top of the pan, which was approximately 1½ hours.

It was then placed in an atmospheric steamer and steamed until it reached a center temperature of 205° F. which was approximately 50 minutes. Thereafter, it was allowed to air cool to room temperature for 30 minutes. Melted butter was then placed on the surface and the surface was browned by heating in an oven set at 450° F. for six minutes. It was then removed from the pan and air cooled to room temperature. The bread was then packaged in polyethylene bags, using tie closures.

The resulting product had good eating quality, and was evaluated as a slightly dense, soft-textured bread. It had a water activity level at this stage of 0.84 and a pH of 6.45.

The bread remained soft and had good eating quality when stored at room temperature for 41 days, and is still in storage.

EXAMPLE 4

A brownie was prepared in accordance with this invention, having the following ingredients:

| Ingredients | % | % H$_2$O of Ingredients | % H$_2$O Contributed to total |
|---|---|---|---|
| Flour | 27.96 | 12.0 | 3.36 |
| Sugar | 29.02 | — | — |
| Cocoa | 3.62 | 5.0 | 0.18 |
| Shortening | 5.56 | — | — |
| Vegetable Oil | 7.72 | — | — |
| Salt | 0.56 | — | — |
| Vanilla Flavor | 0.11 | — | — |
| Sodium Bicarbonate | 0.11 | — | — |
| Whole Eggs | 8.32 | 73.7 | 6.13 |
| Water | 3.62 | 100.0 | 3.62 |
| Glycerine | 7.50 | 4.0 | 0.30 |
| Walnuts | 5.90 | 3.5 | 0.21 |
| | 100.0 | | 13.80 |

The starch to glycerine ratio was 2.72. The water to glycerine ratio was 1.92. The water activity level was 0.66.

The brownie was prepared in accordance with the following procedure. Dry ingredients were placed in a Hobart mixer along with the shortening. They were mixed at #1 speed for one minute using a paddle.

Thereafter, eggs, water, glycerine and the above described mix were mixed for an additional minute at #1 speed. The vegetable oil was added and mixing continued for one more minute at #1 speed. The walls were then scraped down and mixing was continued at #2 speed for three minutes. The walnuts were then added, and mixing continued at #1 speed for another one-half minute.

450 grams of the batter was placed into a 603×108 can with a release paper on the bottom. A release paper was placed on top of the batter. It was then sealed into the can with a 1/16 vent hole pierced in its center.

The sealed cans were placed in an atmospheric steamer at 210° F. and held there until the center of the product reached 200° F., which was approximately 75 minutes.

The cans were removed from the streamer and immediately the vent hole was covered with a sealing tape as described in other examples. They were thereafter allowed to cool to room temperature.

An excellent quality fudge brownie resulted that remained fresh with no starch staling or sugar crystallization. The sample has remained good and has so far been stored at room temperature for 10 months.

EXAMPLE 5

(Chocolate Chip Cookie)

| Ingredients | % | % H$_2$O of Ingredients | % H$_2$O Contributed to total |
|---|---|---|---|
| Butter | 7.97 | 15.5 | 1.24 |
| Shortening | 6.57 | — | — |
| Sugar | 18.26 | — | — |
| Whole egg | 7.35 | 73.7 | 5.42 |
| Flour | 22.21 | 12.0 | 2.67 |
| Baking Soda | 0.35 | — | — |
| Malto Dextrin | 4.38 | 5.0 | 0.22 |
| Chocolate Chips | 24.93 | 0.9 | 0.22 |
| Glycerine | 7.47 | 4.0 | 0.30 |
| Flavoring | 0.51 | — | — |
| Total Water in Dough | | | 10.07 |

Cookie dough was made in a Hobart Mixer with a paddle. Cookie dough (25 gm) was placed on ungreased cookie sheets and baked 9 minutes at 375° F. in a Reel Oven. The baked cookies were cooled 15 minutes on pans on racks and then cooled 2-3 hours at room temperature on the counter top. The cookies were packaged in sealed foil pouches, 3 cookies/pouch and stored. After 54 weeks stored at 70° F. the cookies were still soft and good tasting with no sugar crystallization.

In the cookie dough the ratio of water to liquid polyhydric alcohol was 1:42; the $A_w$ was 0.55; the water to starch was 0.65 and starch to liquid polyhydric alcohol was 2.17.

In the baked good, ratio of water to liquid polyhydric alcohol was 0.72, the $A_w$ was 0.47 and the starch to liquid polyhydric alcohol 2.17.

What is claimed is:

1. A lower moisture, storage stable, ready-to-eat, cooked good which is either a cookie or a brownie, said cooked good being made from a flour containing base batter or dough mix, water, sugar and about 5% to about 15% by weight of said cooked good of a liquid edible polyhydric alcohol, said batter or dough mix having a water activity level sufficiently low to provide a high quality long shelf life cooked good:

the water activity level ($A_w$) of said cooked good being equal to or less than 0.85, the ratio of total water of said cooked good to liquid polyhydric alcohol being equal to or less than 4.8, and the ratio of starch present in the flour of said cooked good to liquid polyhydric alcohol being equal to or less than 3.95.

2. The cooked good of claim 1 wherein the ratio of water to starch is equal to or less than 1.0.

3. The cooked good of claim 1 wherein the ratio of water to sugar is equal to or less than 0.75.

4. The cooked good of claim 1 wherein the water activity level $A_w$ of the cooked good is equal to or less than 0.85.

5. The cooked good of claim 1 wherein the ratio of water to starch is equal to or less than 0.75.

6. The cooked good of claim 1 wherein the ratio of water to sugar is equal to or less than 0.50.

7. A method of making a lower moisture, high quality crumb-structured, ready-to-eat cooked good, said cooked good being made from a flour containing base mix, sugar and a liquid portion of water and a liquid edible polyhydric alcohol, said method comprising:

using liquid edible polyhydric alcohol as a portion of the liquid to be mixed with a flour containing base mix to prepare a batter or dough, preparing a batter or dough from said flour containing base mix by mixing said water, sugar and said liquid edible polyhydric alcohol in a ratio of water to liquid polyhydric alcohol equal to or less than 4.8 in the finished cooked good, thereby forming a batter or dough having an $A_w$ sufficiently low to provide a high quality long shelf life cooked good, and heat processing said batter or dough to cook said good, the amount of said polyhydric alcohol being sufficient to provide in said cooked good an $A_w$ equal to or less than 0.85, a ratio of starch present in the flour to liquid polyhydric alcohol equal to or less than 3.95, and a ratio of water to liquid polyhydric alcohol equal to or less than 4.8.

8. The process of claim 7 wherein said heat processing is atmospheric steam cooking, and includes: filling a container and sealing said container, providing the container with a resealable vent, atmospheric steam cooking of the batter or dough, sealing the vent, and cooling to ready the sealed container for case packing.

9. The process of claim 7 wherein said batter or dough contains as said liquid edible polyhydric alcohol a mixture of glycerine and propylene glycol, with the absolute amount of propylene glycol in said cooked good not exceeding 2% by weight of the cooked good, and wherein said heat processing is conventional oven baking, and includes, filling a container with batter or dough, oven baking the batter or dough filled container to cook the batter or dough forming a cooked good, and cooling and wrapping the cooked good to ready it for case packing.

10. The process of claim 7 wherein said heat processing is oven cooking, and includes:

filling a container with batter or dough and sealing said container, providing the container with a resealable vent, oven cooking of the batter or dough, sealing the vent, and cooling to ready the sealed container for case packing.

11. The process of claim 7 wherein the ratio of water to sugar in the dough or batter is equal to or less than 1.0.

12. The process of claim 7 wherein the ratio of water to starch in the dough or batter is equal to or less than 1.0.

13. The process of claim 7 wherein the ratio of water to sugar in the dough or batter is equal to or less than 0.8.

14. The process of claim 7 wherein the ratio of water to starch in the dough or batter is equal to or less than 1.20.

15. The process of claim 7 wherein the ratio of water to sugar is equal to or less than 1.0.

16. The process of claim 7 wherein the ratio of water to starch is equal to or less than 1.0.

17. The process of claim 7 wherein the ratio of water to sugar is equal to or less than 0.8.

18. The cooked good of claim 1, 2, 3, 4, 5 or 6 wherein the ratio of total water of said cooked good to liquid polyhydric alcohol being equal to or less than about 4.0 and the ratio of starch of said cooked good to liquid polyhydric alcohol being equal to or less than about 3.2.

19. The cooked good of claim 1, 2, 3, 4, 5 or 6 wherein the ratio of total water of said cooked good to liquid polyhydric alcohol being equal to or less than about 2.6 and the ratio of starch of said cooked good to liquid polyhydric alcohol being equal to or less than about 1.8.

20. The process of claim 7 wherein the ratio of total water of said cooked good to liquid polyhydric alcohol being equal to or less than about 4.0 and the ratio of starch of said cooked good to liquid polyhydric alcohol being equal to or less than about 3.2.

21. The process of claim 7 wherein the ratio of total water of said cooked good to liquid polyhydric alcohol being equal to or less than about 2.6 and the ratio of starch of said cooked good to liquid polyhydric alcohol being equal to or less than about 1.8.

22. The process of claim 7 wherein the ratio of water to starch in the cooked good is equal to or less than 1.0.

23. The process of claim 7 wherein the ratio of water to starch in the cooked good is equal to or less than 0.75.

24. The process of claim 22 or 23 wherein the ratio of water to sugar in the cooked good is equal to or less than 0.75.

25. The process of claim 24 wherein the ratio of water to sugar in the cooked good is equal to or less than 0.5.

* * * * *